United States Patent Office 2,763,695
Patented Sept. 18, 1956

2,763,695

PROCESS FOR THE PREPARATION OF STYRENE CHLOROHYDRIN AND STYRENE BROMOHYDRIN

Muus Gerrit Jan Beets and Emanuel Alexander Drukker, Hilversum, Netherlands, assignors to N. V. Polak & Schwarz's Essencefabrieken, Hilversum, Netherlands, a limited liability company of the Netherlands No Drawing. Application May 26, 1953,
Serial No. 357,924

Claims priority, application Netherlands May 31, 1952

9 Claims. (Cl. 260—618)

The present invention relates to a novel process for the preparation of styrene chlorohydrin and styrene bromohydrin.

In the co-pending patent application Serial No. 357,925, of even date, filed by the inventors, there is described the preparation of ω-bromostyrene starting from styrene bromohydrin according to the reaction equation:

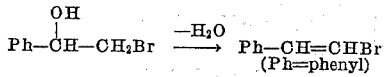

In the U. S. patent application Serial No. 259,881, filed December 4, 1951, now abandoned, a process is described for the preparation of the very important perfume phenyl ethyl alcohol from styrene halohydrins according to the reaction equation:

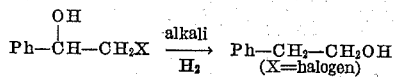

Also styrene halohydrins can be converted in a simple manner into styrene oxide, a compound which also is technically applied (vide the U. S. P. 2,237,284).

As appears from the cited literature it is also possible and even very advantageous with these applications to use instead of the pure halohydrin the technical product which, dependent on the manner of preparation, is contaminated with larger or smaller quantities of styrene dihalide.

Consequently, it is clear that styrene halohydrins can be considered as very useful raw materials for the preparation of a number of commercially important products. These products are obtained by converting the respective styrene halohydrin to one of the above-described conversion products, and the term "converting," as used in the claims, refers to the mentioned conversion processes.

According to a manner of preparation known from the literature (vide U. S. P. 2,237,284) styrene bromohydrin is prepared by stirring water with styrene at an elevated temperature and by adding bromine slowly to this mixture. In this manner the styrene is converted into styrene bromohydrin contaminated with styrene dibromide. This crude bromohydrin is, as said already above, entirely suitable to be converted into phenyl ethyl alcohol, bromostyrene or styrene oxide without further purification.

A disadvantage of these processes is, however, that either half the halogen (when preparing bromostyrene) or the entire halogen (when preparing phenyl ethyl alcohol and styrene oxide), participates in the reaction only as an auxiliary substance.

The object of the process according to the present invention is to prepare styrene chloro- or bromohydrin and to prepare the products obtained therefrom, cited above, according to a process in which the halogen, apart from slight technical losses, is entirely recycled to the process so that the real consumption of halogen is restricted to a minimum.

As will be seen this invention at the same time offers the opportunity to use the cheaper halogen ions as the halogen source instead of halogen.

According to the present invention a process is provided for the preparation of styrene chloro- or bromohydrin which is characterized thereby that styrene is reacted with an aqueous solution containing chlorine or bromine ions and hydrogen ions and with a suitable oxidizing agent.

It is possible to proceed in such a manner that a mixture of styrene and an aqueous solution, containing halogen ions and hydrogen ions in quantities which in principle are stoichiometrically equivalent to each other and to the quantity of styrene, are stirred, preferably at an elevated temperature, while a quantity of suitable oxidizing agent, the quantity of which also is practically equivalent to those of the other components, is slowly added.

By "in principle stoichiometrically equivalent" is only meant that the equivalence is a directive from which it is possible to deviate on need from case to case.

As a particularly suitable oxidizing agent hydrogen peroxide can be considered dissolved in water in an arbitrary concentration or not.

Also aqueous solutions of chloric acid, prepared, if desired, from aqueous solutions of chlorates by the addition of mineral acid can be advantageously used since here all oxygen atoms of the chloric acid are made subservient to the purpose desired.

Finally also other oxidizing agents, such as organic peroxides, a mixture of permanganic acid or permanganates and mineral acid, a mixture of chromium trioxide or bichromate and acid, peracetic acid, perchloric acid and others can be used.

As a halogen source an aqueous solution of hydrohalogenic acid can be used, good results being obtained with hydrocloric acid as well as with hydrobromic acid, while it also is possible to use an alkali halide and a mineral acid, e.g. sodium halide and sulphuric acid.

In the process described in the U. S. patent appln. No. 259,881 as a by-product of the phenyl ethyl alcohol preparation an aqueous solution of alkali bromide is obtained. This can be used without further treatment for the preparation of styrene bromohydrin according to the present invention by adding to this aqueous solution an equivalent of a mineral acid and acting further as described above. It will further be clear that also hydrohalogenic acid or a halide which are obtained as a by-product with any other reaction can be applied to the present process.

Finally it may be advantageous to combine the use of halogen and halogen ion in the same preparation in e.g. the following manner.

When to a mixture of 1 mol styrene and water stirred at an elevated temperature a grammol of bromine is added, on the one hand styrene bromohydrin is obtained, while half of the halogen used remains in the aqueous phase as hydrobromic acid without playing a useful part in the process.

According to the present invention the preparation can be continued without interruption in the same apparatus by adding again an equivalent of styrene, followed by approximately an equivalent of a suitable oxidizing agent. In this manner all the styrene is converted into crude styrene bromohydrin, while at the same time all the halogen brought into reaction, a part of neglectable traces, remaining in the aqueous phase, is used for the purpose aimed at. A further advantage of this process is that a more efficient use is made of the apparatus.

Although the method in principle can be carried out over a wide range of temperatures, it is recommendable in order to obtain satisfactory yields, to carry out the reaction at a temperature which preferably is 90–95° C. At the same time it is recommendable to extend the addition of the oxidizing agent over some hours, preferably 3–5 hours.

The following examples give a further elucidation of the process according to the present invention. In order to give an idea of the quality of the reaction product obtained, in a number of examples the yield obtained on further processing on other products is indicated.

Example I

Into a reaction apparatus 1200 cc. of aqueous hydrochloric acid (3.45 mol.) and 312 g. of styrene (3 mol.) are brought.

One heats to 90° C. and adds at 90–95° C. under vigorous stirring in 3 hours 293 g. of hydrogen peroxide (aqeous solution; 3.1 mol.). One cools to room temperature and separates the lower layer. The yield of crude styrene chlorohydrin amounts to 440 g. When the reaction product is treated with a solution of 167 g. of sodium hydroxide in 750 cc. of water, styrene oxide in a yield of 60%, calculated on styrene, is obtained.

Example II

Into a reaction apparatus are brought: 561 g. of an aqueous hydrobromic acid solution (3 mol.), 400 cc. of water, and 312 g. of styrene (3 mol.).

One heats to 95° C. and adds at 95° C. under vigorous stirring in 3 hours: a solution of 180 g. of sulphuric acid, and 190 g. of potassium permanganate in 3500 cc. of water.

One cools to room temperature and separates the lower layer. The weight of the crude styrene bromohydrin amounts to 570 g. When this is converted into styrene oxide with sodium lye, 56% of the theory, calculated on styrene, are obtained.

Example III

Into a reaction apparatus are brought: 570 g. of hydrobromic acid solution (3 mol.), 600 cc. of water, and 312 g. of styrene (3 mol).

One adds in 3 hours at 90–95° C. under vigorous stirring a quantity of peracetic acid, prepared from 370 g. of 30% hydrogen peroxide, 30 g. of sodium acetate and 321 g. of acetic anhydride.

After cooling the lower layer is separated. The weight of the crude styrene bromohydrin amounts to 510 g.

Example IV

Into a reaction apparatus are brought: 1200 cc. of an aqueous hydrobromic acid solution (3 mol.), and 312 g. of styrene (3 mol.).

At 95° C. one adds in 3 hours: 293 g. of hydrogen peroxide (3.1 mol.).

After cooling the lower layer is separated. Weight of the crude styrene bromohydrin: 600 g.

After conversion with alkali, styrene oxide in 68% of the theory is obtained.

Example V

Into a reaction apparatus are brought: 943 g. of an aqueous solution containing sodium bromide and sodium hydroxide.

One neutralizes with 222 of hydrobromic acid solution to a liquid containing 3.3 mol of sodium bromide.

One adds: 165 g. of sulphuric acid (1.65 mol.), and 312 g. of styrene (3 mol.) and thereupon in 3 hours under vigorous stirring at 95° C: 293.5 g. of 36% hydrogen peroxide (3.1 mol.).

After cooling the lower layer is separated.
Weight crude styrene bromohydrin: 610 g.

When converting into styrene oxide with alkali a yield of 66% of the theory, calculated on styrene, is obtained.

When converting into phenyl ethyl alcohol according to the U. S. patent application Serial No. 259,881 also 66% of the theory, calculated on styrene, are obtained.

Example VI

Into a reaction apparatus are brought: 1000 g. of water, and 260 g. of styrene (2.5 mol.).

One adds in 5 hours under vigorous stirring at 95° C: 400 g. of bromine (2.5 mol.).

One stirs for another 5 minutes and adds: 302.5 g. of styrene (2.91 mol.).

One adds in 3 hours under vigorous stirring at 95° C.: 237 g. of 36% hydrogen peroxide.

One stirs for another 5 minutes, cools and separates the lower layer.

The weight of the crude styrene bromohydrin amounts to 1030 g. When this product is converted into phenyl ethyl alcohol according to U. S. patent application Serial No. 259,881, a yield of 65% of the theory, calculated on styrene is obtained.

Example VII

Into a reaction apparatus are brought: 154 g. (1.3 mol.) of 4-methyl styrene, and 520 cc. of an aqueous hydrobromic acid solution (1.3 mol.)

One heats to 90° C. and adds in 3 hours under vigorous stirring at 90–95° C.: 145 g. of an aqueous hydrogen peroxide solution (35%; 1.45 mol.).

After having stirred further during 10 minutes one cools and separates the lower layer.

Weight crude 4-methyl styrene bromohydrin: 259 g.

On conversion into 4-methyl phenyl ethanol according to U. S. patent application Serial No. 259,881, this product is obtained in a yield of 54%, calculated on methyl styrene. $n_D^{20}$:1.5254 $d_{15}$:1.0003.

What is claimed is:

1. A process for the preparation of a substance selected from the group consisting of styrene chlorohydrin and styrene bromohydrin, comprising reacting styrene with an aqueous solution containing halgoen ions selected from the group consisting of chlorine and bromine ions, hydrogen ions and a water-soluble oxidizing agent.

2. The process of claim 1, wherein the reaction is effected at an elevated temperature.

3. The process of claim 2, wherein the reaction temperature is between about 90–95° C.

4. The process of claim 2, wherein the oxidizing agent is hydrogen peroxide.

5. The process of claim 2, wherein the oxidizing agent is added to the aqueous solution over a period of about 3–5 hours.

6. A process for the preparation of styrene chlorohydrin, comprising reacting styrene with aqueous hydrochloric acid and a water-soluble oxidizing agent at an elevated temperature, the oxidizing agent being added over a period of about 3–5 hours.

7. A process for the preparation of styrene bromohydrin, comprising reacting styrene with aqueous hydrobromic acid and a water-soluble oxidizing agent at an elevated temperature, the oxidizing agent being added over a period of about 3–5 hours.

8. A continuous process for the preparation of a substance selected from the group consisting of styrene chlorohydrin and styrene bromohydrin, comprising the steps of reacting styrene, water and a halogen selected from the group of chlorine and bromine to obtain a reaction mixture containing a substance selected from the group consisting, respectively, of styrene chlorohydrin and styrene bromohydrin and an acid selected from the group consisting, respectively, of hydrochloric acid and hydrobromic acid, and adding to the reaction mixture additional styrene and a water-soluble oxidizing agent.

9. The continuous process of claim 8, wherein the quantity of additional styrene is within about 20% of the quantity of the acid in the reaction mixture.

References Cited in the file of this patent

UNITED STATES PATENTS

| | | |
|---|---|---|
| 2,237,284 | Alquist | Apr. 8, 1941 |
| 2,315,557 | Soday | Apr. 6, 1943 |

OTHER REFERENCES

Handby et al.: J. Chem. Soc. (1946), pp. 114–15.
Golumbic: JACS 61:998.